United States Patent [19]
Korus et al.

[11] Patent Number: 5,918,182
[45] Date of Patent: Jun. 29, 1999

[54] METHOD AND APPARATUS FOR MITIGATING DATA CONGESTION IN AN INTEGRATED VOICE/DATA RADIO COMMUNICATIONS SYSTEM

[75] Inventors: Michael F. Korus; Donald G. Newberg, both of Hoffman Estates, Ill.

[73] Assignee: Motorola, Inc., Schaumburg, Ill.

[21] Appl. No.: 08/706,202

[22] Filed: Aug. 30, 1996

[51] Int. Cl.⁶ .................................................. H04B 7/00
[52] U.S. Cl. ........................ 455/517; 455/527; 370/229
[58] Field of Search ................................. 455/517, 67.1, 455/67.7, 226.1, 512, 527; 370/229, 232, 235

[56] References Cited

U.S. PATENT DOCUMENTS

| | | | |
|---|---|---|---|
| 4,334,306 | 6/1982 | Ulug | 370/235 |
| 5,313,454 | 5/1994 | Bustini et al. | 370/236 |
| 5,420,861 | 5/1995 | De La Bourdonnaye | 370/229 |
| 5,426,640 | 6/1995 | Hluchyj et al. | 370/235 |
| 5,477,542 | 12/1995 | Takamara et al. | . |
| 5,579,301 | 11/1996 | Ganson et al. | 370/229 |
| 5,751,969 | 5/1998 | Kapoor | 370/235 |
| 5,757,771 | 5/1998 | Li et al. | 370/235 |

*Primary Examiner*—Edward F. Urban
*Attorney, Agent, or Firm*—James A. Coffing

[57] ABSTRACT

A method and apparatus for mitigating data congestion in a radio communication system makes use of a data controller that provides a data buffer for storing data messages to be transmitted over a common communication resource. If the stored data messages cannot be favorably transmitted on the common communication resource, the data controller transmits a congestion indication message over the common communication resource to a plurality of communication devices. In this manner, transmission activity is limited at the communication device, thereby allowing for data traffic to be transmitted.

4 Claims, 4 Drawing Sheets

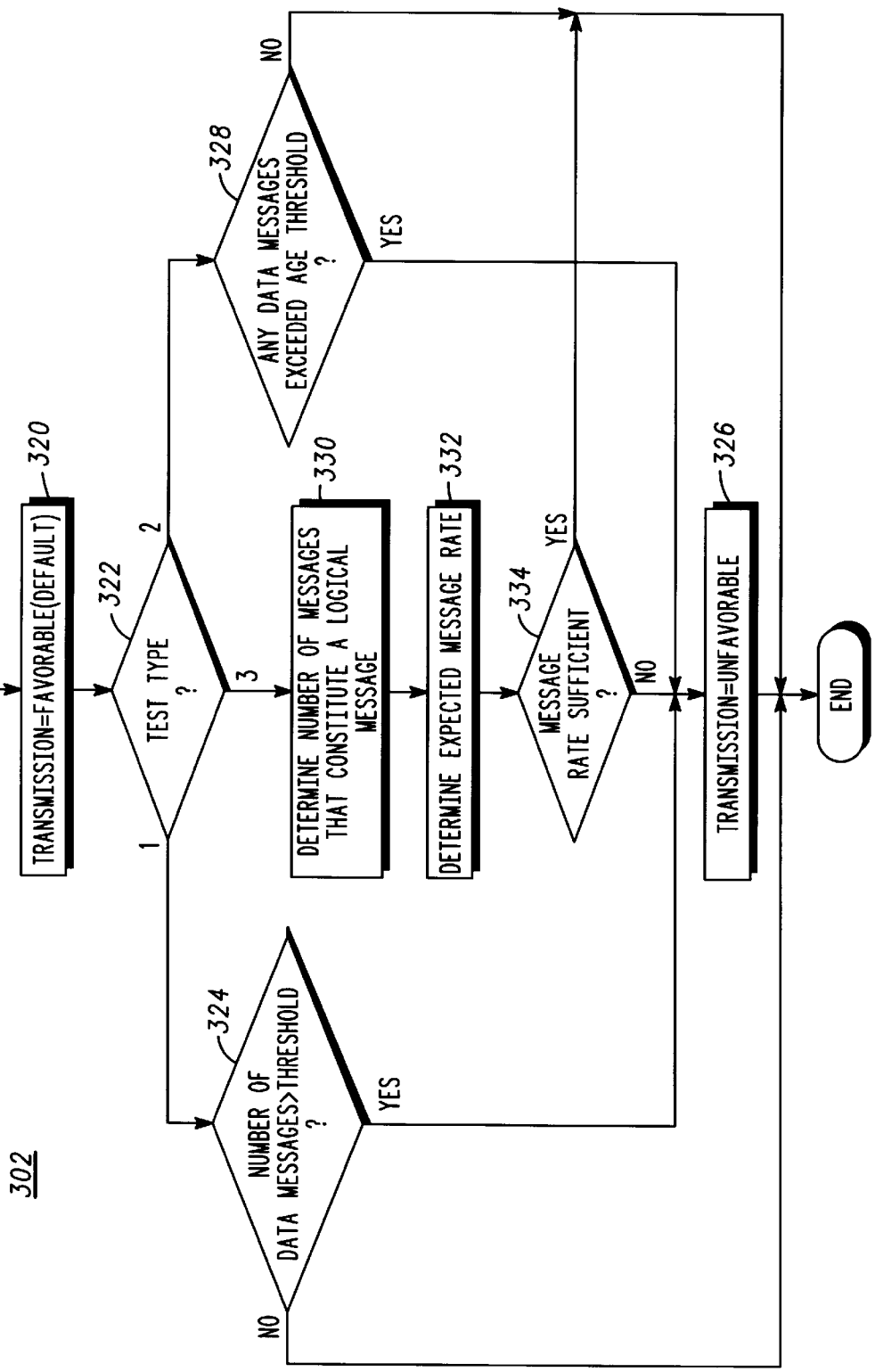

METHOD AND APPARATUS FOR MITIGATING DATA CONGESTION IN AN INTEGRATED VOICE/DATA RADIO COMMUNICATIONS SYSTEM

FIELD OF THE INVENTION

The present invention relates generally to radio communication systems, and more particularly to such systems that integrate voice and data services over a common communication resource.

BACKGROUND OF THE INVENTION

Modern two way radio communication systems are well known in the art, and can generally be characterized as being either conventional or trunked systems. Generally speaking, conventional radio communication systems employ a limited number of communication resources (e.g., RF channel pairs, TDM time slots, etc.) to establish communications between a plurality of communication devices (e.g., consoles, mobile and portable subscribers). While these limited number of communication resources are shared among the plurality of communication devices, it is common for the communication devices to limit their use to a single communication resource, for transmitting data and voice traffic.

By contrast, a trunked communication system includes those components of a conventional communications system, plus a central controller that effectively allocates the limited number of communication resources amongst the plurality of communication devices. In this manner, trunked systems are able to more efficiently distribute the voice and data traffic across the available communication resources. Indeed, trunked radio systems often include dedicated data channels to facilitate large amounts of data traffic between two or more communication devices.

One problem with transmitting both data and voice on a common communication resource, as is the case in a conventional radio system having integrated voice and data services, is the frequent conflict between ongoing voice transmissions and the need for transmitting data over that same resource. For obvious reasons, the ongoing voice traffic is typically given a higher priority than the data messages, resulting in an accumulation of queued data messages at one or more data sources. Of course, the greater the amount of voice traffic in a given period, the more data messages accumulate at the data sources. Over time, the foregoing scenario results in undue transmission delays and even lost data messages. Increasing the data buffer size at each of the accumulation points is not only cost prohibitive, but only delays the inevitable, i.e., that data messages will eventually accumulate to a point of congestion.

While the problem of dropped data messages is obvious, the problems associated with data transmission delays is more subtle. First, because voice traffic typically has priority over data traffic, the users of the radio communication system may not even be aware that data messages are accumulating. Thus, without indication that there may be a problem, the users continue transmitting voice traffic, thereby adding to the problem. In those instances where voice traffic is preempting the transmission of data, the system becomes inundated with retry requests in an attempt to empty the data buffers at the data sources. For each second that the data remains stagnant in the data buffer, unable to be transmitted, the data itself becomes less and less useful. By way of example, a police officer waiting for vehicle license information from a central console requires a timely response to his data request. If the voice/data channel is congested, his data cannot be sent in a timely fashion. Of course, this problem is exaggerated under emergency conditions.

Accordingly, there exists a need for a radio communications system that mitigates data congestion in an integrated voice / data communications system. In particular, a radio communication system that is capable of detecting congestion and taking steps to mitigate that congestion on a common communication resource would be an improvement over the prior art.

BRIEF DESCRIPTION OF THE DRAWINGS

FIGS. 3A and 3B show data flow diagrams depicting operation of the data controller shown in FIG. 1.

DETAILED DESCRIPTION OF A PREFERRED EMBODIMENT

The present invention encompasses a method and apparatus for mitigating data congestion in a radio communication system. A data controller provides a data buffer for storing data messages for transmission over a common communication resource. It is then determined whether or not the plurality of data messages can be favorably transmitted on the common communication resource. If the stored data messages cannot be favorably transmitted on the common communication resource, the data controller transmits a congestion indication message over the common communication resource to a plurality of communication devices. In this manner, periods of peak data traffic can be accommodated by initiating a change in resource usage by the communication devices. Such a method and apparatus is not found in the prior art, where such congestion indication messages are sent out to the data sources themselves.

Figure 1:
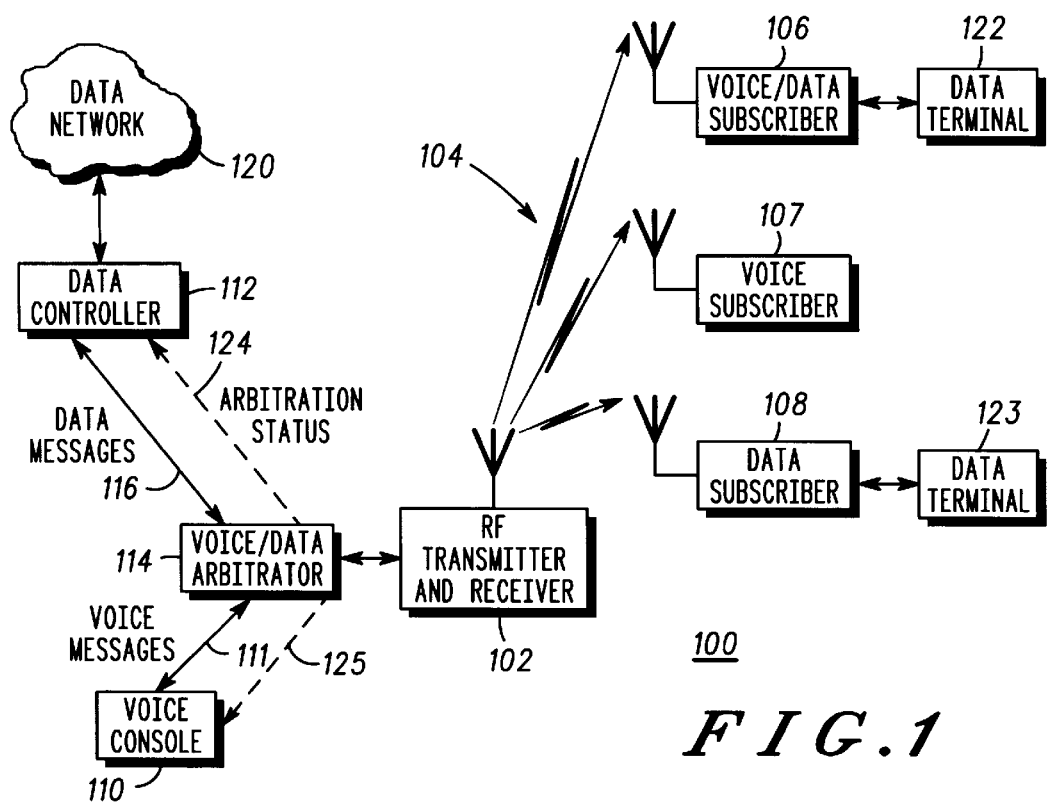
FIG. 1 shows a block diagram of a radio communication system that might embody the present invention.

FIG. 1 shows a radio communication system that might employ a method according to the present invention. A radio frequency (RF) transceiver, or repeater 102, uses a common communication resource 104 to communicate with a plurality of communication devices 106–108. It should be noted that the common communication resource 104 might be an RF channel pair, a TDMA time slot, etc., while the communication devices 106–108 may be either voice and or data subscribers, as shown.

Another component of the radio communication system 100 is a console 110 that facilitates transmission of voice messages 111, for use on the common communication resource 104. Similarly, a data controller 112 conveys to a voice/data arbitrator 114 data messages 116 for simultaneous transmission on the communication resource 104. It is noted that on the fixed end (which includes data controller 112 and the voice/data arbitrator 114), the data messages 116 are sourced from a data network 120, as shown. By contrast, at the subscriber end, data messages are handled using a data terminal 122, 123, as shown in FIG. 1.

The voice console 110 and data controller 112 both access the communication resource 104 through the voice/data arbitrator 114. The voice/data arbitrator allocates a communication resource based on a prioritization scheme and the presence of ongoing data messages 116 or voice messages 111. The voice/data arbitrator 114 indicates the arbitration status to the data controller using link 124 (and to the console using link 125). This status message informs the data controller or console when the communication resource 104 is unavailable due to transmissions that are in progress.

Figure 2:
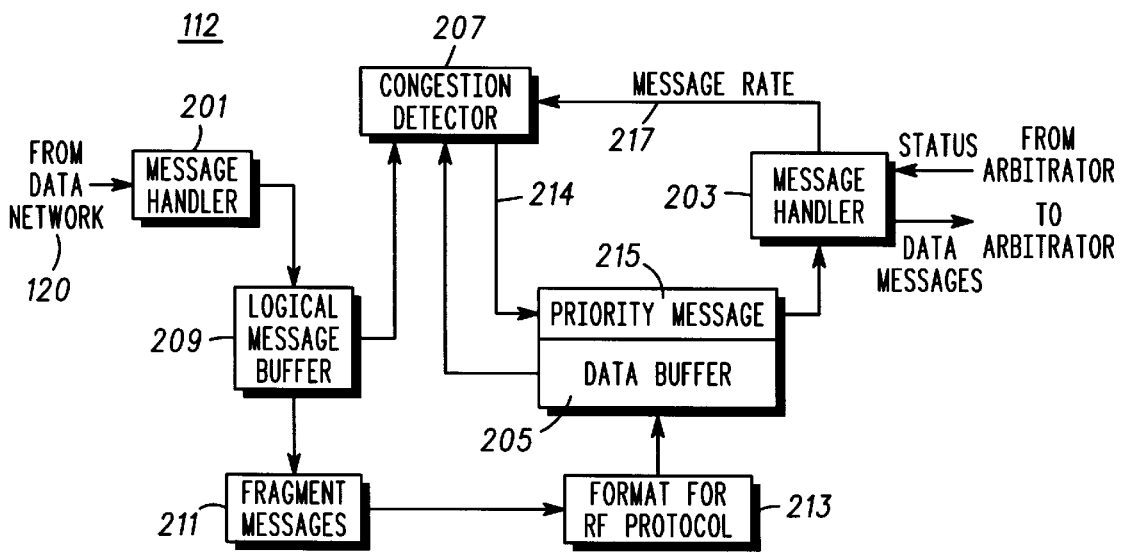
FIG. 2 shows a more detailed block diagram of the data controller shown in FIG. 1.

FIG. 2 shows a detailed block diagram of the data controller 112 shown in FIG. 1. Generally speaking, the data controller facilitates the passage of data messages 116, as shown in FIG. 1, between the data network 120 and the arbitrator 114. To do this, a first message handler 201 is used in cooperation with a second message handler 203 to pass data from the data network 120 to the arbitrator 114. According to the invention, a critical element of the data controller 112 is a data buffer 205 and a congestion detector 207. Data messages are placed in the data buffer 205 after data from the network 120 has been prepared for RF delivery. Data is removed from the data buffer 205 for transmission on a first-in-first-out (FIFO) basis when the communication resource 104 becomes available. The congestion detector 207 examines the contents of the logical message buffer 209, the contents of the data buffer 205, and the message rate 217 to determine if the transmission of the data messages will be limited by the availability of the communication resource 104.

In accordance with a preferred embodiment of the invention, the logical message buffer 209 is coupled between the message handler 201 and a message fragmentor 211, whereby the logical message buffer relays information to the congestion detector, as later described. Data from the data network 120 is stored in the logical message buffer 209. The message fragmentor 211 breaks the logical messages into blocks and used to determine favorability, as later described. The RF protocol formatter 213 appends additional bits to the blocks creating data messages suitable for RF transport, which messages are placed in the data buffer 205.

According to the invention, the data buffer 205 includes a priority message location 215. Data messages within this priority message location 215 are, according to a preferred embodiment, the next message transmitted by the message handler 203. The congestion detector 207 writes congestion indication messages 214 to the priority message location 215 as shown and later described.

Figure 3A:
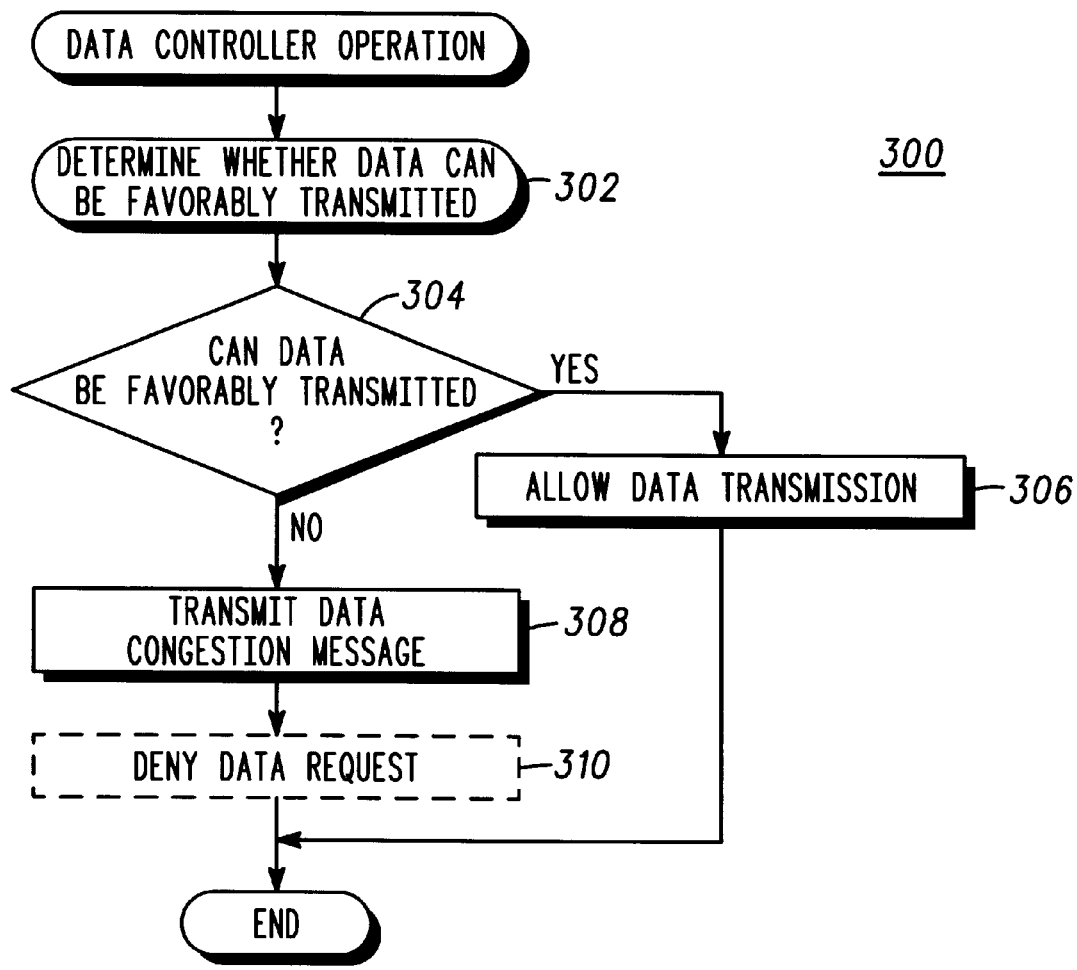

FIG. 3-1 shows a high level flow diagram 300 that depicts operation of the data controller, in accordance with the present invention. When data is made available for transmission on the common communication resource, a routine is reached to determine (302) whether or not that data can be favorably transmitted on the common communication resource. If it is determined (304) that the data can be favorably transmitted (e.g., by a flag being set that indicates transmission is favorable) on the common communication resource, data transmission is allowed (306), and the routine is exited. If the data cannot be favorably transmitted, as determined by a process later described, the data congestion message is transmitted (308) on the common communication resource to the plurality of subscribers in the system. At this point, the data controller optionally may deny (310) data requests stemming from the data network 120 as shown in FIG. 1. This last optional step represents a fixed-end solution that may be employed in addition to the subscriber-end solution described with reference to FIG. 4.

FIG. 3-2 shows a more detailed flow diagram (302) of the determination of favorability. Before any processing is done, the 'transmission' variable is set to 'favorable', indicating that the data can be favorably transmitted (it is noted that this is the default value). A decision (322) is then reached to determine which test types are to be employed by the data controller.

Test type 1 uses the queue length to evaluate congestion conditions. This test is based on the fact that when the number of data messages in the data buffer 205 exceeds a threshold, data messages are being excessively queued, which generally leads to buffer overflow and dropped data messages.

Test type 2 looks at the length of time that data messages have spent in the data buffer 205 to determine if any of the data messages are becoming obsolete due to excessive delay. It should be noted that this test is independent of the number of data messages currently in the data buffer 205.

Test type 3 looks for the presence of large logical messages that were received from the data network and have been fragmented within the data controller. Generally, these fragments need to be transmitted with minimal delay between them, preventing protocols such as TCP from timing out and re-transmitting the entire logical message. The combination of large logical messages and low message rates indicate a potential congestion condition.

If test type 1 is to be employed, a determination (324) is made as to whether or not the number of data messages in the data buffer exceeds a predetermined threshold. If the threshold is not exceeded, the routine is exited and the data transmission will be allowed. If the threshold is exceeded, the transmission variable is made unfavorable (326), thereby inhibiting the transmission of data at this time. The value of the threshold is chosen such that the probability of buffer overflow is relatively low. Depending on the buffer size and expected data message arrival rate, this number would typically be in the range of 60%–90% of the total buffer capacity.

If test type 2 is to be employed, a decision is reached (328) that determines whether any data messages exceed an age threshold. If no data messages exceed that age threshold, the routine is exited. Should any message in the data buffer exceed the predetermined age threshold, the transmission parameter is made unfavorable (326), and the data transmission will be denied. According to the invention, the age threshold depends largely on the type of data messages. Emergency messages usually require very short delays, on the order of a few seconds. Non-emergency messages such as status and database updates can tolerate longer delays, on the order of tens of seconds. The delay that can be tolerated is also dependent on the sensitivity of the underlying protocols to time delay. Allowing the age threshold to change dynamically provides a means to aid the transmission of time-sensitive information.

Lastly, if test type 3 is to be employed, the first step is to determine (330) the number of messages that constitute a logical message. As used herein, a logical message is fragmented into individual data messages if it exceeds the maximum transfer size that is supported by the system (typically around 576 bytes). Together these data message fragments constitute a logical message. Next, an expected message rate is determined (332) and inputted into the congestion detector 207 shown in FIG. 2. The expected message rate is the number of data messages per unit of time (e.g., seconds) that the system is able to transmit. In a preferred embodiment, the expected message rate is based on previous message rates and whether the communication resource is currently available. The expected message rate indicates whether all of the data messages that make up a logical message can be transmitted in the time frame required for the logical message to be useful. It is next determined (334) whether or not the expected message rate is sufficient to permit the transmission of data at this time, as described above. If the message rate is sufficient, the routine is exited. If the data rate proves to be insufficient, the transmission variable is set to unfavorable (326), and message transmission will be denied.

Figure 4:
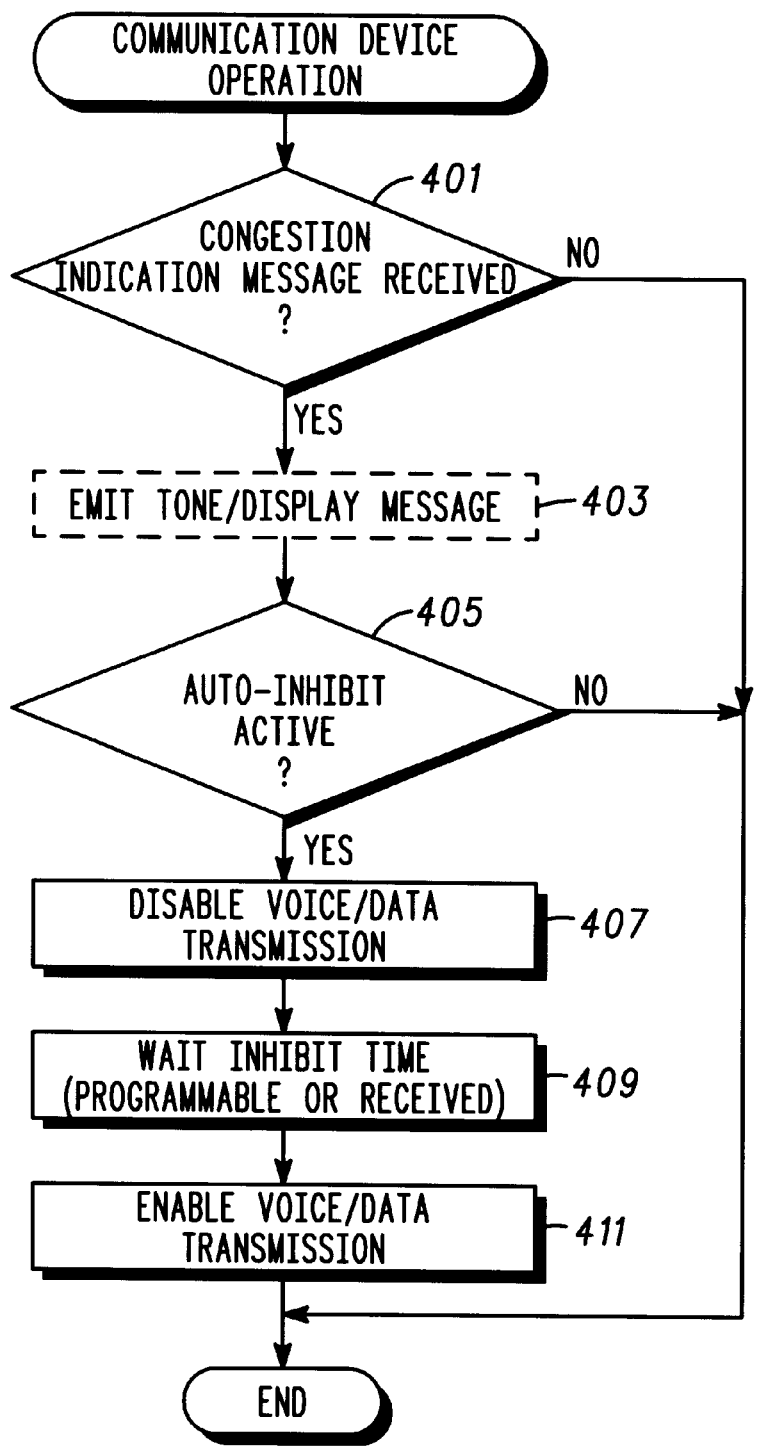
FIG. 4 shows a data flow diagram depicting operation of a communication device, in accordance with the present invention.

FIG. 4 shows a flow diagram 400 depicting the operation of a communication device, in accordance with the present invention. The communication device operates normally until a congestion indication message is received (401). At this time, the communication device optionally performs (403) one or more of the following two functions: 1) emits an audible tone for the user to hear; and/or 2) displays a message for the user to see. A decision is then reached to determine (405) whether or not the auto-inhibit feature has been activated in the radio. If the auto-inhibit feature is inactive, the routine is exited, but if active, the voice/data transmissions are disabled (407). It should be noted that while voice/data transmissions are disabled, the radio disregards all transmit requests from the user, data terminal, or internal processes.

Upon disabling the transmissions, the radio waits (409) for a predetermined period, referred to as the inhibit time, which can be either programmed in the radio or received by the radio from the data controller along with the data congestion message. The inhibit time is preferably only a few seconds long because many data messages can be sent in a relatively short time when the communication resource becomes available. In the simplest case, the inhibit time is programmed into the radio for ease of implementation. For a more sophisticated solution, it might be desirable for the inhibit time to be sent by the data controller as part of the congestion indication message. This would allow the inhibit time to match the level of congestion, increasing the inhibit time as congestion persists or to accommodate especially long logical messages. After the inhibit time, the voice/data transmissions are enabled (411) and the routine is exited.

In this manner, the present invention mitigates data congestion. As described herein, data congestion occurs when voice and data traffic share a common communication resource because the voice users have no knowledge regarding the presence of data traffic. The present invention accommodates peaks in data traffic by making voice users aware of the need for data bandwidth and temporarily suspending their voice traffic capability. Thus, voice traffic maintains priority during normal operation, but data is given priority under certain conditions of resource congestion. That is, unlike prior art techniques that reduce congestion by putting limits on the data sources, the present invention mitigates congestion by limiting the interfering traffic.

What is claimed is:

1. A fixed end data controller for use in a radio communication system that facilitates transmission of higher priority voice messages and lower priority data messages on a common communication resource, the data controller comprising:

a data buffer that stores a plurality of the lower priority data messages during periods of transmitting the higher priority voice messages over the common communication resource;

a first message handler, operably coupled between a message source and the data buffer;

a second message handler, operably coupled to the data buffer; and congestion detection means, operably coupled to the data buffer and the second message handler, for detecting whether transmission of the stored plurality of outbound data messages will result in congestion of the common communication resource.

2. The fixed end data controller of claim 1, wherein the congestion detection means comprises means for transmitting a data congestion indication message to the data buffer for subsequent transmission therefrom toward a plurality of communication devices.

3. The fixed end data controller of claim 2, wherein the data buffer includes a priority message portion, wherein the data congestion message is written into the priority message portion for subsequent transmission thereof on the common communication resource.

4. The fixed end data controller of claim 1, wherein the message handler comprises means for determining an expected message rate for the common communication resource.

* * * * *